United States Patent
McCue et al.

(10) Patent No.: US 11,343,973 B2
(45) Date of Patent: May 31, 2022

(54) POLE SAW

(71) Applicant: MILWAUKEE ELECTRIC TOOL CORPORATION, Brookfield, WI (US)

(72) Inventors: Shane McCue, Greenfield, WI (US); John L. Whealon, West Bend, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1 day.

(21) Appl. No.: 16/417,716

(22) Filed: May 21, 2019

(65) Prior Publication Data
US 2019/0357446 A1 Nov. 28, 2019

Related U.S. Application Data

(60) Provisional application No. 62/675,663, filed on May 23, 2018.

(51) Int. Cl.
*A01G 3/08* (2006.01)
*B27B 17/00* (2006.01)

(52) U.S. Cl.
CPC .......... *A01G 3/086* (2013.01); *B27B 17/0008* (2013.01); *B27B 17/0083* (2013.01)

(58) Field of Classification Search
CPC . B27B 17/0006; B27B 17/0083; B27B 17/00; B27B 17/0008; B27B 17/02; B27B 17/08; B27B 17/14; A01G 3/086; A61B 17/149
USPC ........................................ 30/296.1, 381–387
See application file for complete search history.

(56) References Cited

U.S. PATENT DOCUMENTS

| | | | |
|---|---|---|---|
| 2,703,928 A | 3/1955 | Southwick | |
| 2,708,525 A | 5/1955 | Woleslagle | |
| 2,881,519 A | 4/1959 | Gardner | |
| 2,933,112 A * | 4/1960 | Bentley | B27B 17/14 30/386 |
| 3,158,956 A | 12/1964 | Gudmundsen | |
| 3,343,613 A | 9/1967 | Carnesecca, Jr. et al. | |

(Continued)

FOREIGN PATENT DOCUMENTS

| | | |
|---|---|---|
| CN | 2349767 Y | 11/1999 |
| CN | 201192009 Y | 2/2009 |

(Continued)

*Primary Examiner* — Jason Daniel Prone
(74) *Attorney, Agent, or Firm* — Michael Best & Friedrich LLP

(57) ABSTRACT

An outdoor tool includes a powerhead, a tool unit powered by the powerhead, and a shaft assembly extending between the powerhead and the tool unit. The tool unit includes a transmission housing, a support plate, a guide bar adjustably supported by the support plate, a drive gear, and a chain circumscribing a portion of the drive gear and a portion of the guide bar, the drive gear operatively coupled to the powerhead. The tool unit further includes a tension adjustment mechanism for adjusting a position of the guide bar relative to the drive gear to increase and decrease a tension in the chain. The tension adjustment mechanism includes an adjustment screw, a threaded adjustment bolt, at least one adjustment gear, and a member coupled to the adjustment bolt and the guide bar. Rotation of the adjustment screw causes translation of the guide bar relative to the drive gear.

9 Claims, 13 Drawing Sheets

(56) References Cited

U.S. PATENT DOCUMENTS

| | | | |
|---|---|---|---|
| 3,382,898 A * | 5/1968 | Walker | B27B 17/14 30/382 |
| 3,636,995 A | 1/1972 | Newman | |
| 3,731,380 A | 5/1973 | Mathiesen | |
| 3,731,382 A | 5/1973 | Wroe | |
| 3,866,320 A * | 2/1975 | Progl | B27B 17/14 30/386 |
| 3,949,817 A * | 4/1976 | Rice | A01G 3/08 173/170 |
| 4,048,722 A | 9/1977 | Howard | |
| 4,063,359 A | 12/1977 | Luscombe | |
| 4,159,049 A | 6/1979 | Merz | |
| 4,207,675 A * | 6/1980 | Causey | A01G 3/08 30/296.1 |
| 4,224,739 A * | 9/1980 | Emblidge | A01G 3/0255 30/249 |
| 4,341,017 A | 7/1982 | Janczak | |
| 4,359,822 A | 11/1982 | Kolodziejczyk | |
| 4,567,658 A * | 2/1986 | Wissmann | B27B 17/14 30/386 |
| 4,654,971 A | 4/1987 | Fettes et al. | |
| 4,760,646 A | 8/1988 | Siegler | |
| 4,916,818 A | 4/1990 | Panek | |
| 4,924,573 A | 5/1990 | Huddleston et al. | |
| 4,991,298 A * | 2/1991 | Matre | A01G 3/08 30/296.1 |
| 4,999,917 A * | 3/1991 | Neville | A01G 3/08 30/296.1 |
| 4,999,918 A * | 3/1991 | Schliemann | B27B 17/14 30/383 |
| 5,001,858 A | 3/1991 | Frazar | |
| 5,013,282 A | 5/1991 | Keller | |
| 5,070,618 A * | 12/1991 | Edlund | B27B 17/14 30/385 |
| 5,107,594 A * | 4/1992 | Ferreras | B27B 17/0058 30/372 |
| 5,125,461 A * | 6/1992 | Hoser | B25D 16/006 173/109 |
| 5,144,751 A * | 9/1992 | Weber | B27B 17/14 30/383 |
| 5,174,029 A | 12/1992 | Talberg | |
| 5,243,764 A * | 9/1993 | Wieland | B27B 17/02 30/381 |
| 5,345,686 A | 9/1994 | Zimmermann | |
| 5,353,506 A * | 10/1994 | Muller | B27B 17/02 30/383 |
| 5,491,899 A * | 2/1996 | Schliemann | B27B 17/14 30/386 |
| 5,497,557 A * | 3/1996 | Martinsson | B27B 17/14 30/386 |
| 5,522,143 A | 6/1996 | Schliemann et al. | |
| 5,528,835 A * | 6/1996 | Ra | B27B 17/14 30/383 |
| 5,653,028 A | 8/1997 | Hashimoto | |
| 5,718,050 A * | 2/1998 | Keller | B27B 17/086 30/123.4 |
| 5,787,536 A * | 8/1998 | Pate | B27B 17/0008 30/122 |
| 5,819,418 A | 10/1998 | Uhl | |
| 5,884,403 A * | 3/1999 | Rogers | A01G 3/08 144/24.13 |
| 5,896,669 A | 4/1999 | Uhl | |
| 5,896,670 A * | 4/1999 | Gibson | B27B 17/14 30/386 |
| 5,926,961 A | 7/1999 | Uhl | |
| 5,983,508 A * | 11/1999 | Sundstrom | B27B 17/14 30/383 |
| 6,006,434 A * | 12/1999 | Templeton | A01D 34/90 30/296.1 |
| 6,032,373 A | 3/2000 | Peterson | |
| 6,049,986 A * | 4/2000 | Calkins | B27B 17/14 30/383 |
| 6,061,915 A * | 5/2000 | Seigneur | B27B 17/14 30/383 |
| 6,112,419 A | 9/2000 | Uhl et al. | |
| 6,122,830 A * | 9/2000 | Jarzombek | A01D 34/902 30/276 |
| 6,148,525 A | 11/2000 | Mizutani et al. | |
| 6,182,367 B1 | 2/2001 | Janczak | |
| 6,474,747 B2 * | 11/2002 | Beaulieu | F16B 7/042 30/296.1 |
| 6,493,949 B2 * | 12/2002 | Kondo | B27B 17/14 30/383 |
| 6,516,522 B2 | 2/2003 | Schneider | |
| 6,560,879 B2 * | 5/2003 | Franke | B27B 17/00 30/383 |
| 6,564,459 B1 * | 5/2003 | Steinbrueck | B27B 17/14 30/375 |
| 6,622,387 B2 | 9/2003 | Uhl et al. | |
| 6,651,347 B2 | 11/2003 | Uhl | |
| 6,694,623 B1 * | 2/2004 | Haughey | B27B 17/14 30/386 |
| 6,735,873 B2 | 5/2004 | Langhans et al. | |
| 6,787,028 B2 | 9/2004 | Uhl et al. | |
| 6,904,687 B1 | 6/2005 | Hill, Sr. | |
| 6,997,633 B2 * | 2/2006 | Thomas | A01D 34/90 30/122 |
| 7,107,689 B2 * | 9/2006 | Keeton | B27B 17/14 30/383 |
| 7,152,328 B2 * | 12/2006 | Champlin | A01G 3/08 30/381 |
| 7,155,832 B2 * | 1/2007 | Warfel | B27B 17/02 30/383 |
| 7,266,892 B2 * | 9/2007 | Racov | A01G 3/08 30/276 |
| 7,322,114 B2 * | 1/2008 | Kawamura | B27B 17/14 30/383 |
| 7,331,110 B2 * | 2/2008 | Dahlberg | A01G 3/08 30/123 |
| D566,505 S | 4/2008 | Gieske et al. | |
| 7,350,301 B2 | 4/2008 | Chung Lee | |
| 7,434,502 B2 * | 10/2008 | Keeton | B27B 17/14 30/386 |
| 7,481,000 B2 * | 1/2009 | Tynes | B27B 17/14 30/386 |
| 7,484,300 B2 * | 2/2009 | King | A01G 3/08 30/166.3 |
| 7,520,029 B2 | 4/2009 | Jonsson | |
| 7,676,934 B2 | 3/2010 | Liao | |
| 7,703,211 B1 | 4/2010 | Kirchoff | |
| 7,743,513 B1 * | 6/2010 | Fisher | B27B 17/14 30/383 |
| 7,917,997 B2 | 4/2011 | Jonsson | |
| 8,020,304 B2 | 9/2011 | Mace et al. | |
| 8,132,484 B2 * | 3/2012 | Pfleiderer | B27B 17/02 74/606 R |
| 8,136,254 B2 | 3/2012 | Gieske et al. | |
| 8,186,066 B2 | 5/2012 | Doragrip et al. | |
| 8,418,898 B2 * | 4/2013 | Carlsson | A45F 3/14 224/162 |
| 8,434,236 B2 * | 5/2013 | Pellenc | B27B 17/14 30/381 |
| 8,495,819 B2 * | 7/2013 | Okouchi | B27B 17/14 30/386 |
| 8,539,678 B2 * | 9/2013 | Dahlberg | A01G 3/053 30/199 |
| 8,615,890 B2 * | 12/2013 | Wolf | B27B 17/02 30/383 |
| 8,672,162 B2 * | 3/2014 | Okouchi | B25F 5/00 137/846 |
| 9,009,920 B1 * | 4/2015 | Ramsey | B25G 1/04 16/429 |
| D745,353 S | 12/2015 | Pickett et al. | |
| 9,204,707 B2 * | 12/2015 | Ito | A45F 3/14 |
| 9,220,204 B2 * | 12/2015 | Capers | A01G 23/095 |
| 9,333,636 B2 * | 5/2016 | Yamada | A01D 34/90 |
| 9,364,968 B2 * | 6/2016 | Takahashi | B27B 17/14 |
| 9,445,553 B2 | 9/2016 | McCracken | |
| 9,492,941 B2 | 11/2016 | Mace et al. | |

(56) References Cited

U.S. PATENT DOCUMENTS

| | | |
|---|---|---|
| 9,591,809 B2 | 3/2017 | Gieske et al. |
| 9,676,115 B2* | 6/2017 | Takayanagi ............. B27B 17/14 |
| 9,718,208 B2* | 8/2017 | Takayanagi ............. B27B 17/14 |
| D799,917 S | 10/2017 | Mehra et al. |
| D799,918 S | 10/2017 | Mehra et al. |
| 10,376,973 B2* | 8/2019 | Nie ......................... B27B 17/14 |
| 10,390,493 B2* | 8/2019 | Sinyard ................... A01G 3/086 |
| 10,434,682 B2* | 10/2019 | Bonomi .................... B28D 7/00 |
| 10,638,666 B2* | 5/2020 | Fu ........................... A01G 3/086 |
| 10,779,468 B2* | 9/2020 | Ota .......................... A01D 34/828 |
| 2002/0194739 A1* | 12/2002 | Krane ...................... A01G 3/08 30/296.1 |
| 2004/0049925 A1 | 3/2004 | Verges et al. |
| 2005/0025636 A1 | 2/2005 | Durr |
| 2006/0005673 A1 | 1/2006 | Long et al. |
| 2006/0179806 A1 | 8/2006 | Maier et al. |
| 2006/0230900 A1* | 10/2006 | Bergquisto .............. B27B 17/14 83/381 |
| 2006/0283023 A1* | 12/2006 | Hesson ................. A01D 34/902 30/296.1 |
| 2007/0054542 A1* | 3/2007 | Champlin .......... H01R 13/5845 439/449 |
| 2007/0062361 A1* | 3/2007 | Xiong ..................... B27B 17/14 83/814 |
| 2007/0095792 A1 | 5/2007 | Kremsler et al. |
| 2007/0234579 A1 | 10/2007 | Patrick |
| 2008/0016705 A1 | 1/2008 | Heinzelmann |
| 2008/0236124 A1 | 10/2008 | Heinzelmann |
| 2009/0241353 A1* | 10/2009 | Ericson ................... B27B 17/14 30/386 |
| 2010/0043234 A1 | 2/2010 | Pellenc |
| 2010/0126029 A1 | 5/2010 | Peterson |
| 2011/0203123 A1* | 8/2011 | Holcomb ................ B27B 17/00 30/382 |
| 2013/0142563 A1* | 6/2013 | Sumi ....................... A01G 3/067 403/109.1 |
| 2013/0161047 A1 | 6/2013 | Hallendorff |
| 2013/0167434 A1 | 7/2013 | Firth |
| 2013/0263710 A1 | 10/2013 | Cohen |
| 2014/0106915 A1* | 4/2014 | Kistler .................... B27B 17/14 474/111 |
| 2015/0129273 A1 | 5/2015 | Miyakawa |
| 2016/0227694 A1 | 8/2016 | Bermudez |
| 2016/0238082 A1 | 8/2016 | Densborn et al. |
| 2017/0066119 A1 | 3/2017 | Fu et al. |
| 2017/0072584 A1 | 3/2017 | Pellenc |
| 2017/0079215 A1 | 3/2017 | Bian et al. |
| 2017/0100852 A1* | 4/2017 | Galster ................. B27B 17/025 |
| 2017/0210027 A1* | 7/2017 | Fohrenbach ........... A01G 3/086 |
| 2017/0303474 A1 | 10/2017 | Sheffer et al. |
| 2018/0084731 A1* | 3/2018 | Harris ....................... B25F 5/02 |
| 2018/0177135 A1* | 6/2018 | Fu ........................... A01G 3/086 |
| 2018/0281225 A1* | 10/2018 | Gerstenberger ........ B27B 17/14 |
| 2019/0217496 A1* | 7/2019 | Shibata ................ B23D 57/023 |
| 2019/0242090 A1* | 8/2019 | Peterson ................... E02F 5/02 |
| 2019/0357445 A1* | 11/2019 | McCue .................... A01G 3/053 |
| 2019/0358801 A1* | 11/2019 | McCue ..................... B25F 3/00 |

FOREIGN PATENT DOCUMENTS

| | | |
|---|---|---|
| CN | 202738509 U | 2/2013 |
| CN | 103314797 A | 9/2013 |
| CN | 203261831 U | 11/2013 |
| CN | 203505150 U | 4/2014 |
| CN | 203594742 U | 5/2014 |
| CN | 205305524 U | 6/2016 |
| DE | 8816301 U1 | 6/1989 |
| DE | 4222075 A1 | 1/1994 |
| DE | 202009002225 U1 | 6/2009 |
| WO | 8905715 A1 | 6/1989 |
| WO | 8908381 A1 | 9/1989 |
| WO | 2010140939 A1 | 12/2010 |
| WO | 2011155880 A1 | 12/2011 |
| WO | 2013074005 A1 | 5/2013 |
| WO | 2015053666 A1 | 4/2015 |
| WO | 2015072525 A1 | 5/2015 |

* cited by examiner

POLE SAW

CROSS-REFERENCE TO RELATED APPLICATIONS

This application claims priority to U.S. Provisional Patent Application No. 62/675,663, filed on May 23, 2018, the entire contents of which is incorporated herein by reference.

FIELD OF THE INVENTION

The invention generally relates to outdoor tools, and, more particularly, to a pole saw.

BACKGROUND OF THE INVENTION

Outdoor tools, such as pole saws, are used to perform outdoor tasks, such as cutting tree branches.

SUMMARY OF THE INVENTION

In one aspect, an outdoor tool generally includes a powerhead, tool unit powered by the powerhead, and an elongated shaft assembly extending along a shaft axis between the powerhead and the tool unit. The tool unit includes a transmission housing fixed to the shaft assembly, a support plate coupled to the transmission housing, a guide bar adjustably supported by the support plate, a drive gear rotatably supported by the transmission housing, and a chain circumscribing a portion of the drive gear and a portion of the guide bar, the drive gear operatively coupled to the powerhead for driving the chain about the guide bar. The tool unit further includes a tension adjustment mechanism for adjusting a position of the guide bar relative to the drive gear in order to increase and decrease a tension in the chain. The tension adjustment mechanism includes an adjustment screw, a threaded adjustment bolt, at least one adjustment gear intermeshed with the adjustment screw and the adjustment bolt, and a member coupled to the adjustment bolt and the guide bar. Rotation of the adjustment screw rotates the adjustment bolt and thereby causes translation of the guide bar relative to the drive gear.

In another aspect, an outdoor tool generally includes a powerhead, a tool unit powered by the powerhead, and an elongated shaft assembly extending along a shaft axis between the powerhead and the tool unit. The tool unit includes a transmission housing fixed to the shaft assembly, a support plate coupled to the transmission housing, a cover coupled to the support plate wherein the support plate and cover define a cavity, a guide bar adjustably supported by the support plate, a drive gear rotatably supported by the transmission housing, and a chain circumscribing a portion of the drive gear and a portion of the guide bar, the drive gear operatively coupled to the powerhead for driving the chain about the guide bar. The drive gear, a portion of the guide bar, and a portion of chain are housed in the cavity. The tool unit also includes a lubrication system operable to lubricate the chain. The lubrication system includes an oil reservoir, a pump drivingly coupled to the drive gear and in fluid communication with the oil reservoir and the cavity, wherein operation of the pump pumps lubricant from the oil reservoir to the cavity. The lubrication system also includes an inlet tube extending from the oil reservoir to the pump, a channel defined in the cavity between the support plate and a surface of the guide bar, and an outlet tube extends from the pump to the cavity.

Other independent aspects of the invention may become apparent by consideration of the detailed description and accompanying drawings.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

DETAILED DESCRIPTION

Figure 1:
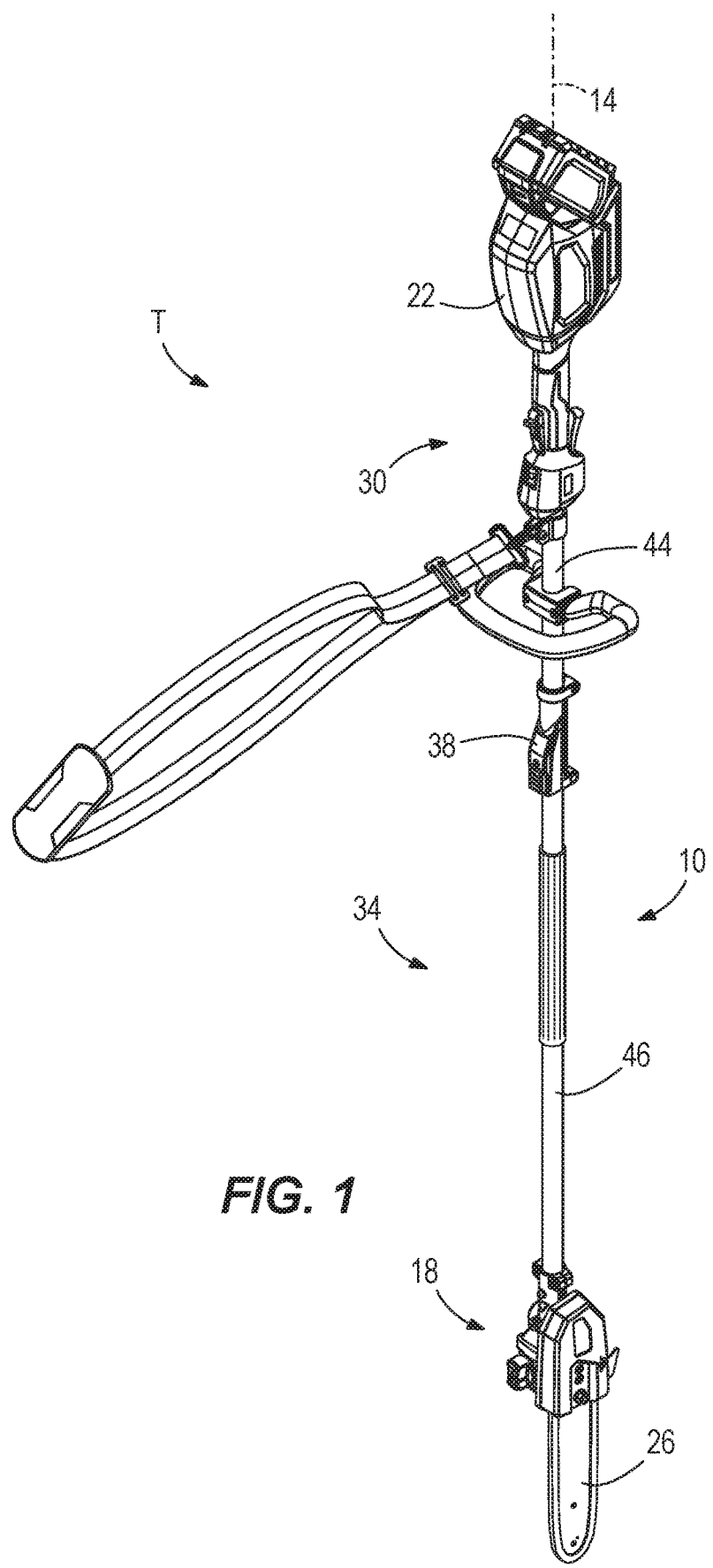
FIG. 1 is a perspective view of an outdoor tool, such as a pole saw, including a pole saw attachment.
Figure 2:
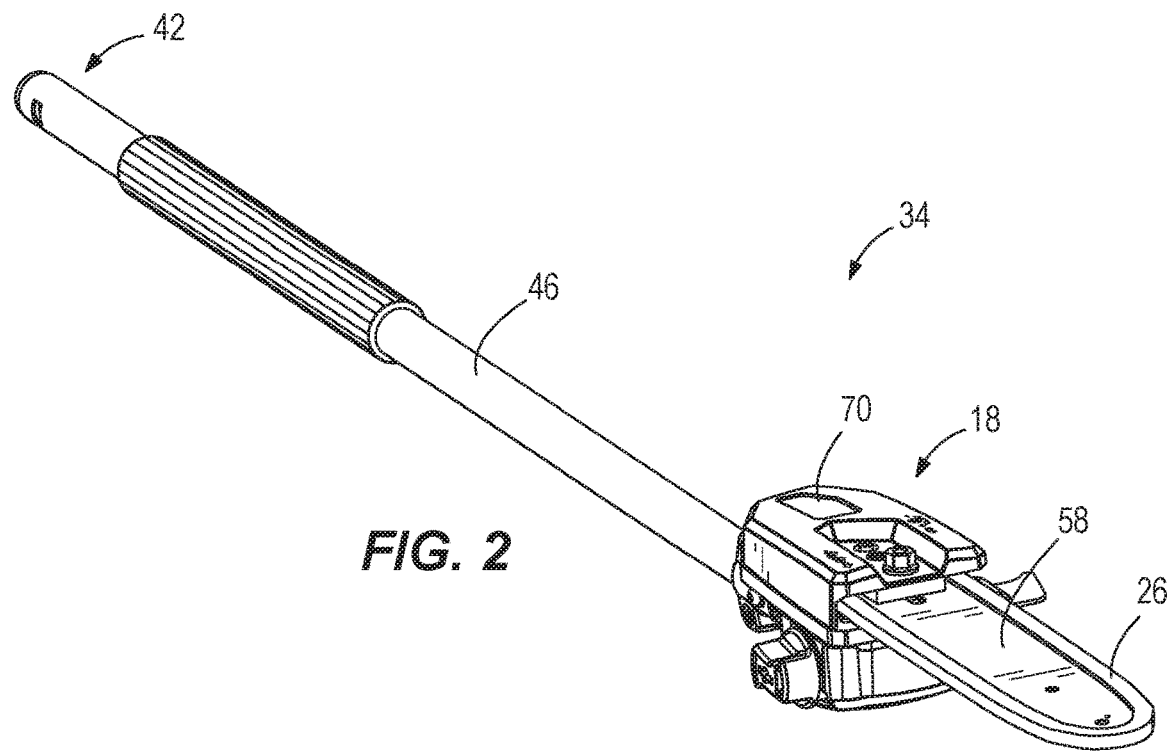
FIG. 2 is a perspective view of the pole saw attachment of FIG. 1.
Figure 3:
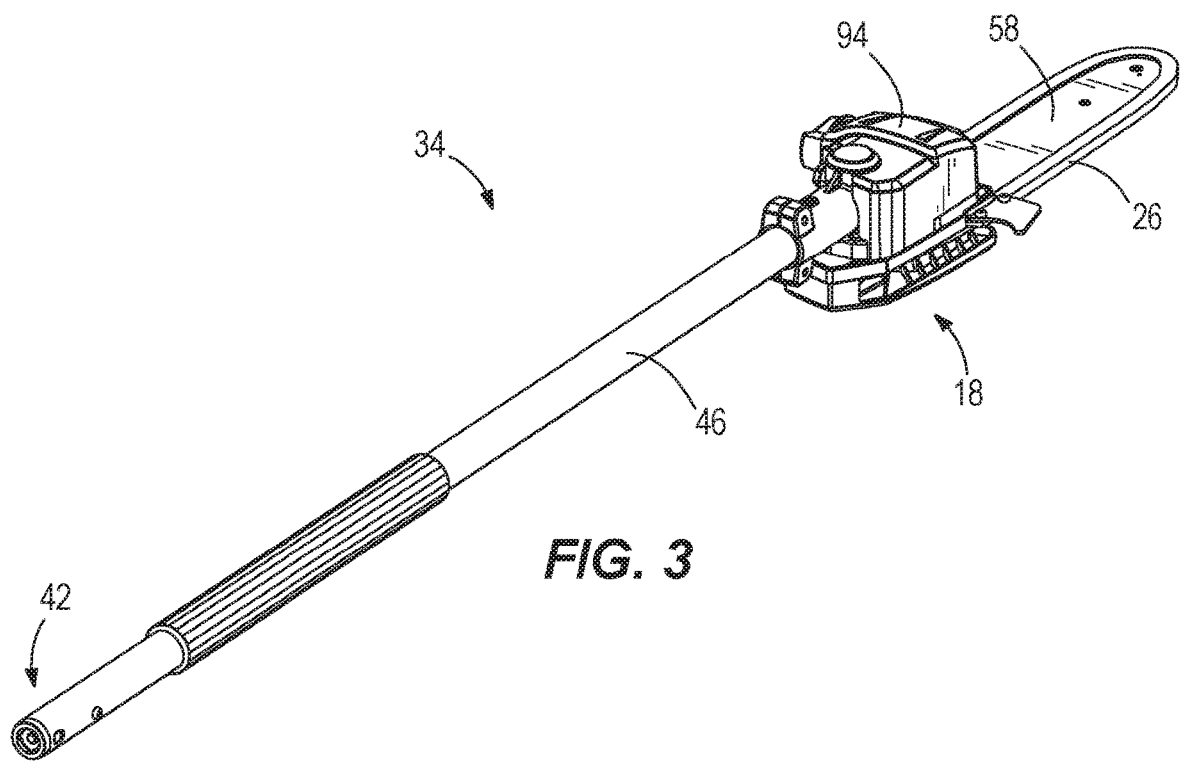
FIG. 3 is another perspective view of the pole saw attachment of FIG. 1.
Figure 4:
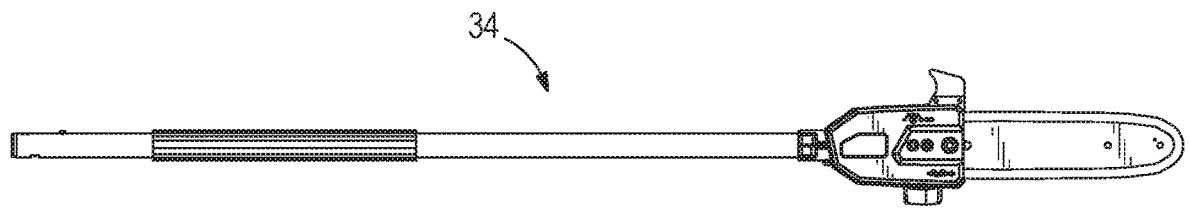
FIG. 4 is a side view of the pole saw attachment of FIG. 1.
Figure 5:
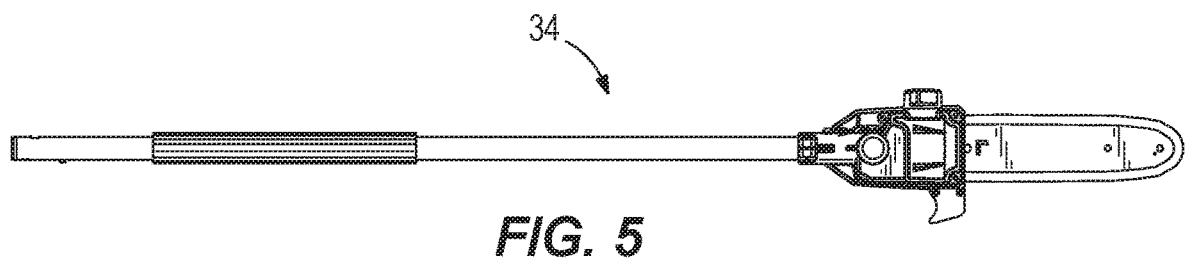
FIG. 5 is another side view of the pole saw attachment of FIG. 1.
Figure 6:
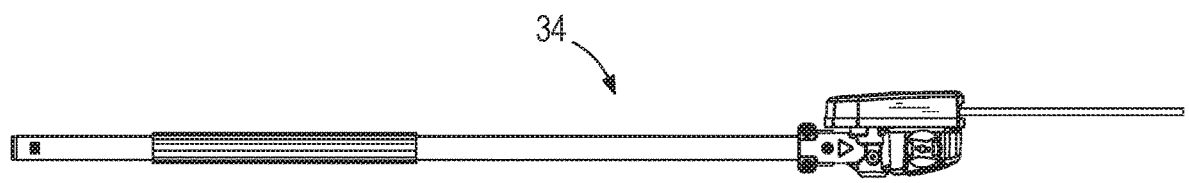
FIG. 6 is a top view of the pole saw attachment of FIG. 1.
Figure 7:
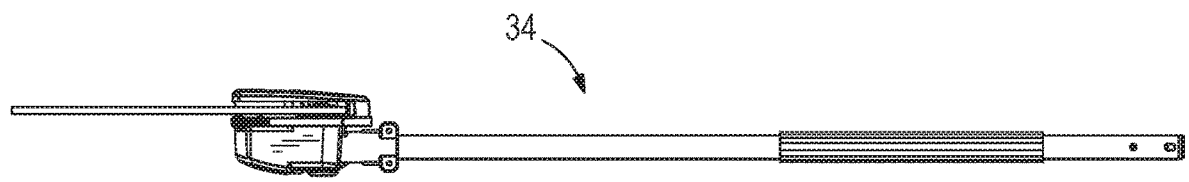
FIG. 7 is a bottom view of the pole saw attachment of FIG. 1.
Figure 9:
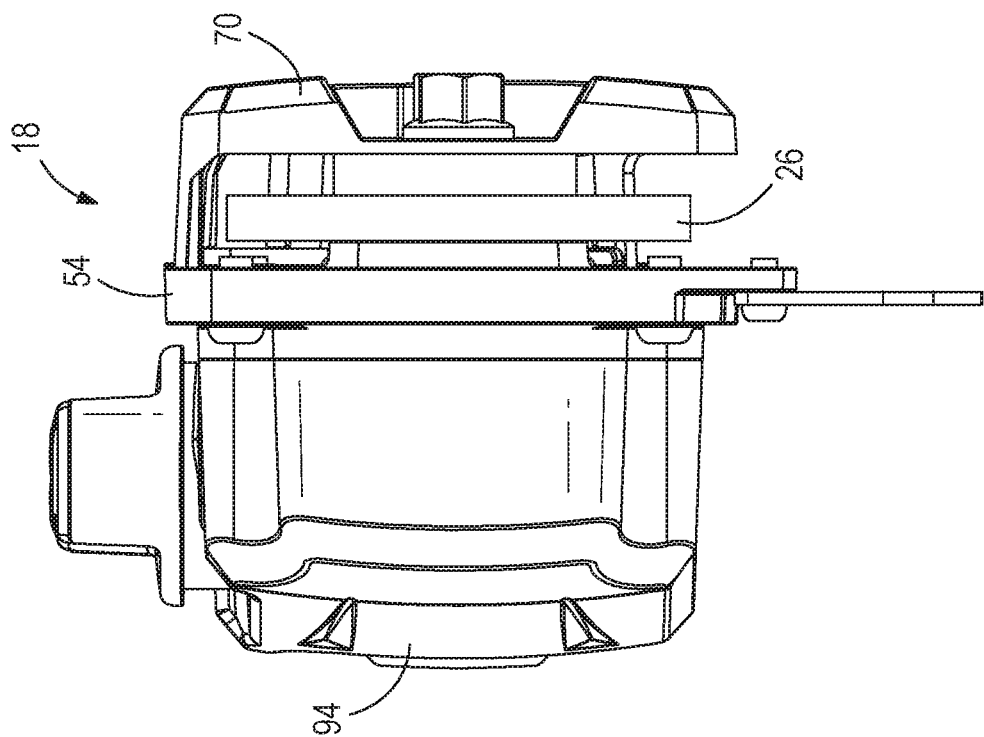
FIG. 9 is another end view of the pole saw attachment of FIG. 1.
Figure 8:
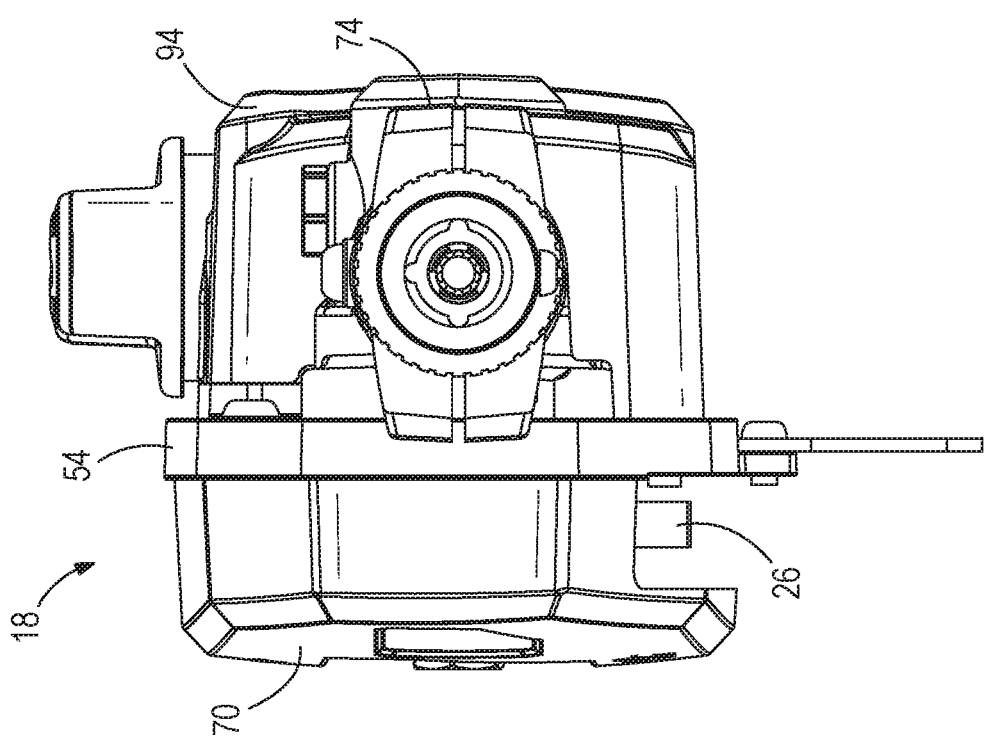
FIG. 8 is an end view of the pole saw attachment of FIG. 1.
Figure 10:
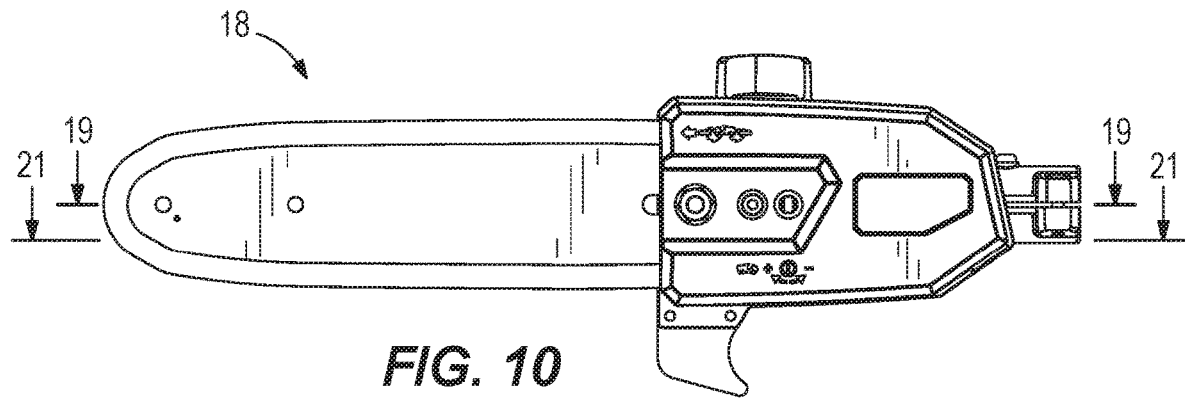
FIG. 10 is a side view of a saw head of FIG. 2.
Figure 11:
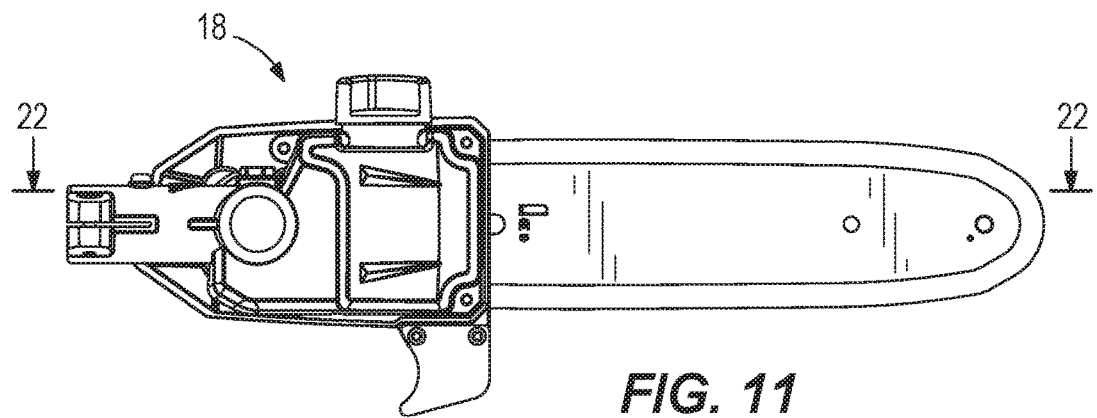
FIG. 11 is another side view of the saw head of FIG. 2.
Figure 12:
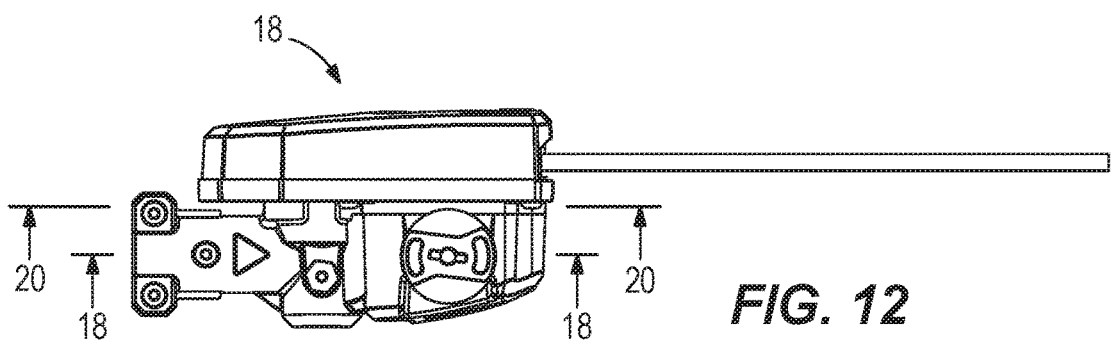
FIG. 12 is a top view of the saw head of FIG. 2.
Figure 13:
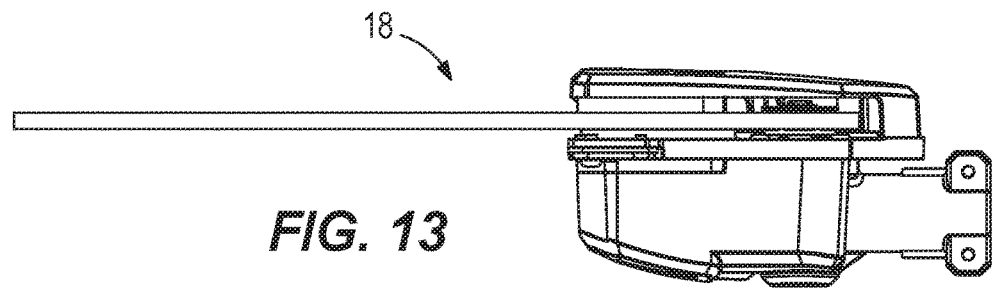
FIG. 13 is a bottom view of the saw head of FIG. 2.

FIG. 1 illustrates an outdoor tool T, such as a pole saw, for use in performing outdoor tasks such as cutting tree branches. The outdoor tool T includes an elongated shaft assembly 10 extending along a shaft axis 14, a tool or saw head 18 at one end of the shaft assembly 10, and a powerhead 22 at an opposite end of the shaft assembly 10. The saw head 18 includes a saw chain 26 for performing cutting. The powerhead 22 generates a motive force to drive the saw chain 26 during operation of the outdoor tool T.

In the illustrated construction, the outdoor tool T includes a powerhead unit 30 and an attachment or tool unit 34, such as a pole saw attachment 34, selectively and removably coupled to the powerhead unit 30 via connecting portions 38, 42 (FIGS. 23-27). The shaft assembly 10 includes first and second shaft segments 44, 46. The powerhead unit 30 includes the powerhead 22, the first shaft segment 44, and the first connecting portion 38, and the attachment unit 34 includes the saw head 18, the second shaft segment 46, and the second connecting portion 42. In other constructions (not shown), the outdoor tool T is a standalone tool, so that the saw head 18 and the powerhead 22 are not separable.

Figure 18:
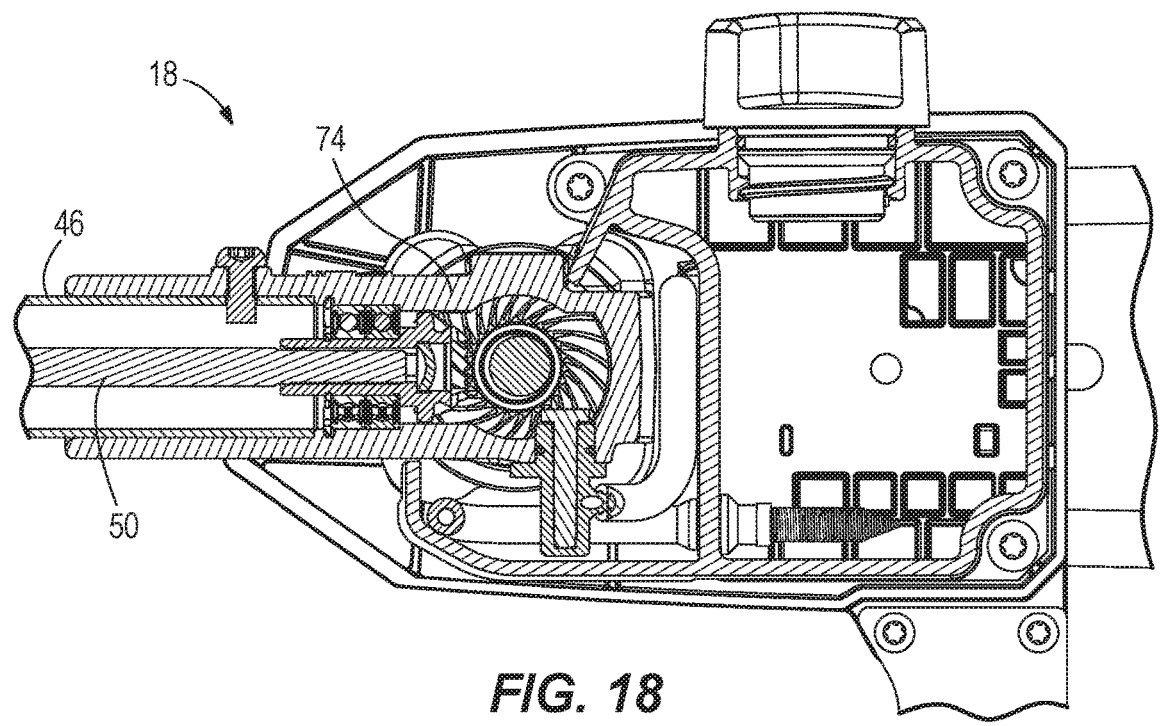
FIG. 18 is a cross-sectional side view of the saw head of FIG. 2, taken generally along line 18-18 of FIG. 12.

A first driveshaft segment 48 (partially shown in FIGS. 26-27) extends axially within the first shaft segment 44 along the shaft axis 14 and is drivingly coupled to the powerhead 22. A second driveshaft segment 50 (FIG. 18) extends axially within the second shaft segment 46 and is drivingly coupled to the saw head 18. When the attachment unit 34 is attached to the powerhead unit 30, the first driveshaft segment 48 couples to the second driveshaft segment 50 to drivingly transmit rotary power from the powerhead 22 to the saw head 18.

A similar powerhead unit is described and illustrated in U.S. Provisional Patent Application No. 62/675,661, filed May 23, 2018, entitled "POWERHEAD UNIT FOR TOOL", and in corresponding U.S. patent application Ser. No. 16/417,713, filed May 21, 2019, entitled "POWERHEAD UNIT FOR TOOL", the entire contents of which is hereby incorporated by reference.

Figure 14:
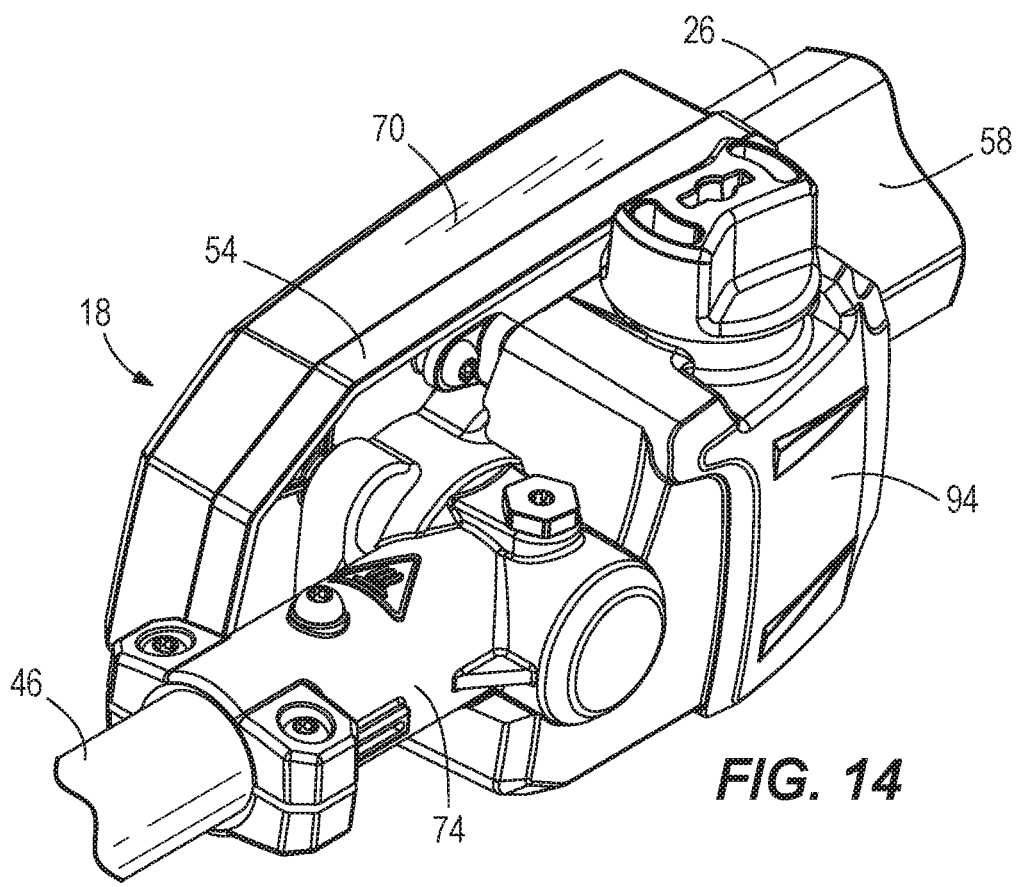
FIG. 14 is a perspective view of the saw head of FIG. 2.
Figure 15:
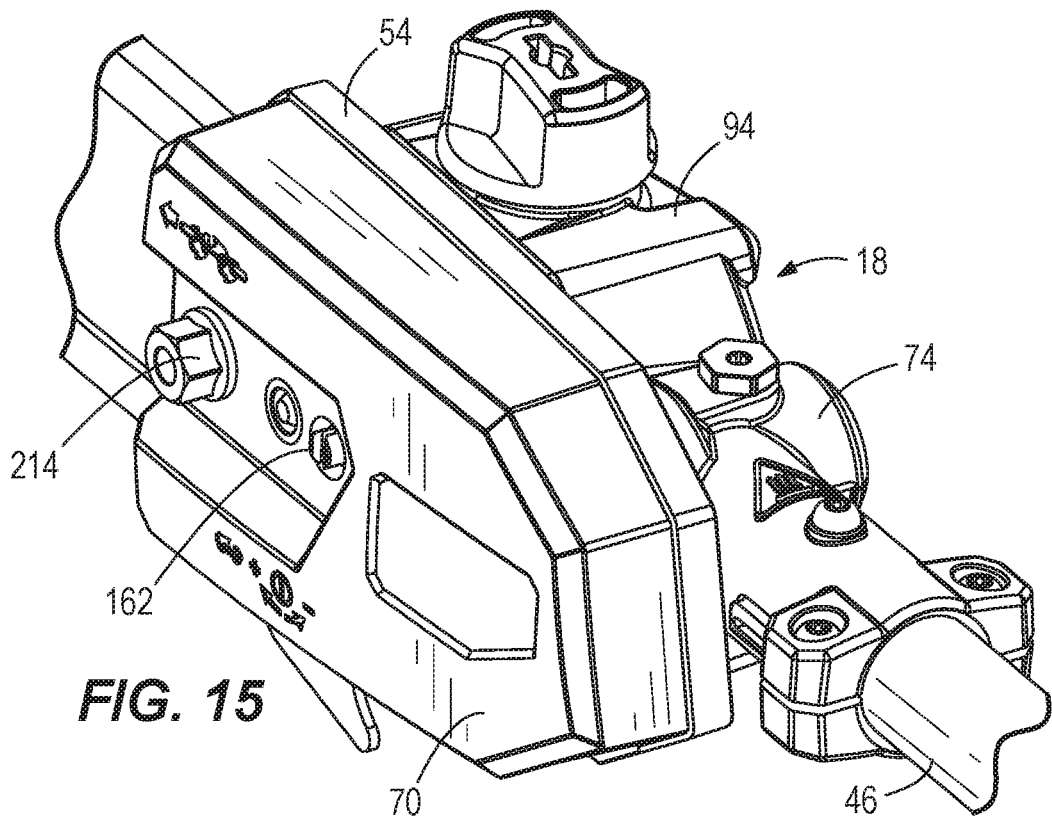
FIG. 15 is another perspective view of the saw head of FIG. 2.
Figure 16:
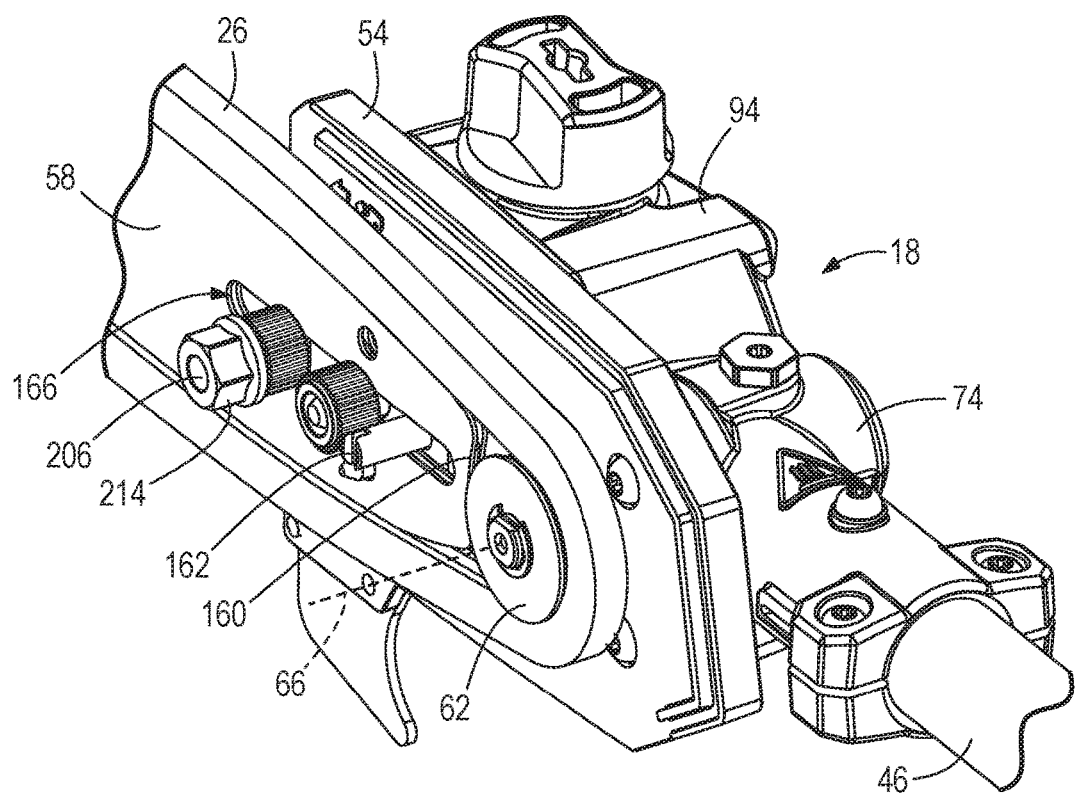
FIG. 16 is another perspective view of the saw head of FIG. 2, with a cover removed.

With reference to FIGS. 14-16, the saw head 18 includes a support plate 54 (FIG. 16) and a guide bar 58 adjustably mounted to the support plate 54. The guide bar 58 supports the chain 26 so that the chain 26 circulates about a perimeter of the guide bar 58 during operation. A sprocket 62 (FIG. 16) engages the chain 26 and rotates about a sprocket axis 66 to drive the chain 26 about the guide bar 58. A sprocket cover 70 (FIG. 15) is coupled to the support plate 54 to retain and shield the covered components (e.g., the sprocket 62, the chain 26, etc.) from debris and to inhibit accidental contact with moving components (e.g., the sprocket 62, the chain 26, etc.).

The saw head 18 also includes a transmission housing 74 affixed to the support plate 54 and coupled to the second shaft segment 46 whereby the second shaft segment 46 is received therein. In the illustrated construction, the saw head 18 is fixed relative to the shaft assembly 10. In other constructions (not shown), the saw head 18 may be supported for pivoting movement relative to the shaft assembly 10 about an axis generally perpendicular to the shaft axis 14 (e.g., about the sprocket axis 66). A similar pivoting mechanism is described and illustrated in U.S. Provisional Patent Application No. 62/675,662, filed May 23, 2018, entitled "HEDGE TRIMMER", and in corresponding U.S. patent application Ser. No. 16/417,715, filed May 21, 2019, entitled "HEDGE TRIMMER", the entire contents of which is hereby incorporated by reference.

The second driveshaft segment 50 of the saw head 18 terminates within the gear housing 74. A transmission or gear assembly 78 (FIG. 19) transmits the rotary motion of the second driveshaft segment 50 to the sprocket 62 to circulate the chain 26 about the guide bar 58.

The gear assembly 78 includes an input gear 82 and an output gear 86. The input gear 82 is coupled to the second driveshaft segment 50 within the gear housing 74 for rotation about the shaft axis 14. The output gear 86 is supported within the gear housing 74 by an output shaft 90 for rotation about the sprocket axis 66. The input gear 82 engages and drives the output gear 86 when the second driveshaft segment 50 is rotated by the powerhead 22. A portion of the output shaft 90 extends through the support plate 54 and is drivingly coupled to the sprocket 62.

Figure 17:
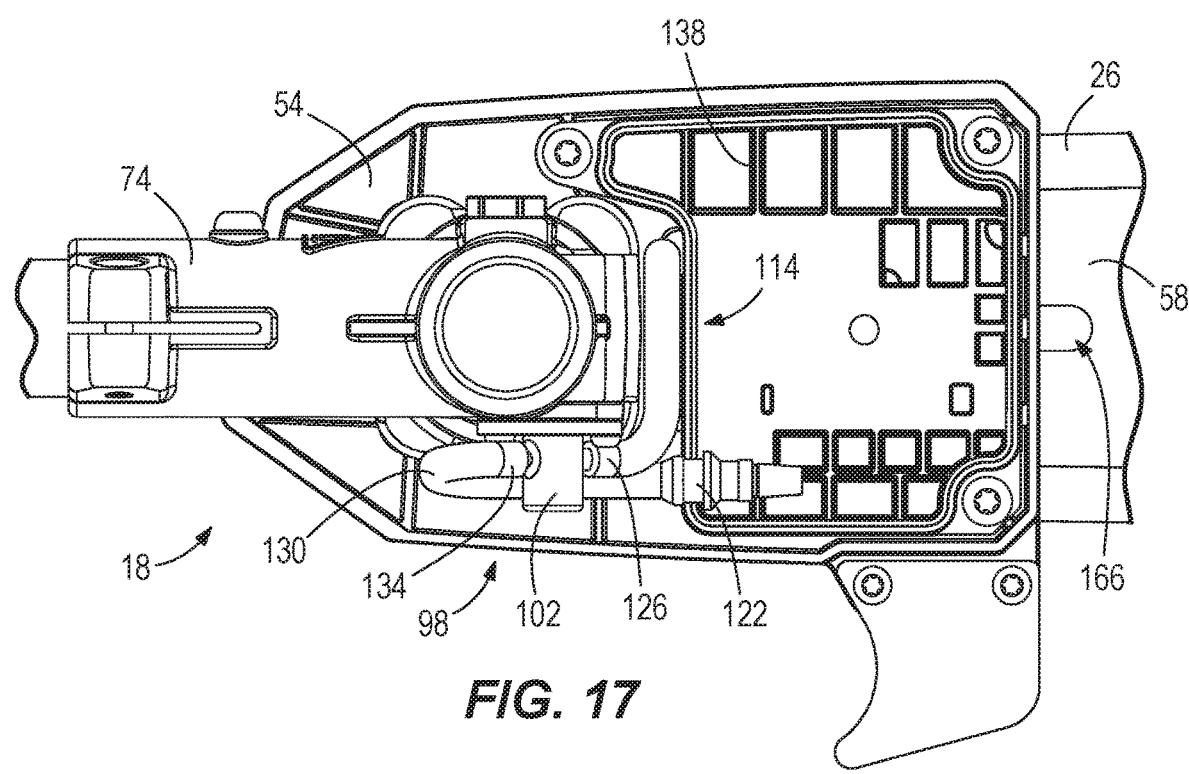
FIG. 17 is a side view of the saw head of FIG. 2 with the reservoir removed.
Figure 19:
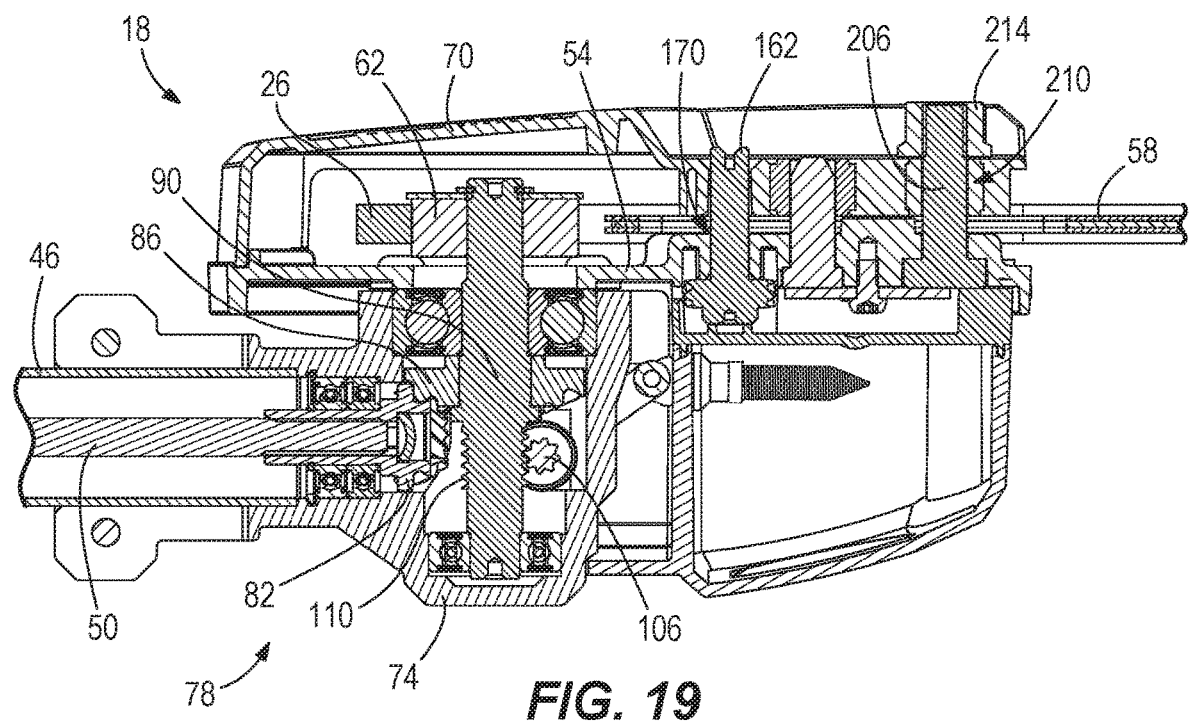
FIG. 19 is another cross-sectional view of the saw head of FIG. 2, taken generally along line 19-19 of FIG. 10.

The saw head 18 also includes an oil reservoir 94 (FIG. 14) and a lubrication system 98 (FIG. 17) operable to supply lubricant (e.g., oil, etc.) from the oil reservoir 94 to the guide bar 58 and to the chain 26. Specifically, FIG. 17 illustrates the saw head 18 with the oil reservoir 94 removed and depicts an oil pump 102 housed within the gear housing 74. The oil pump 102 includes a pinion 106 (FIG. 19) that engages a worm gear 110 formed on the output shaft 90 (FIG. 19). The worm gear 110 rotates during operation of the outdoor tool T to drive the pinion 106 and operate the oil pump 102.

Figure 22:
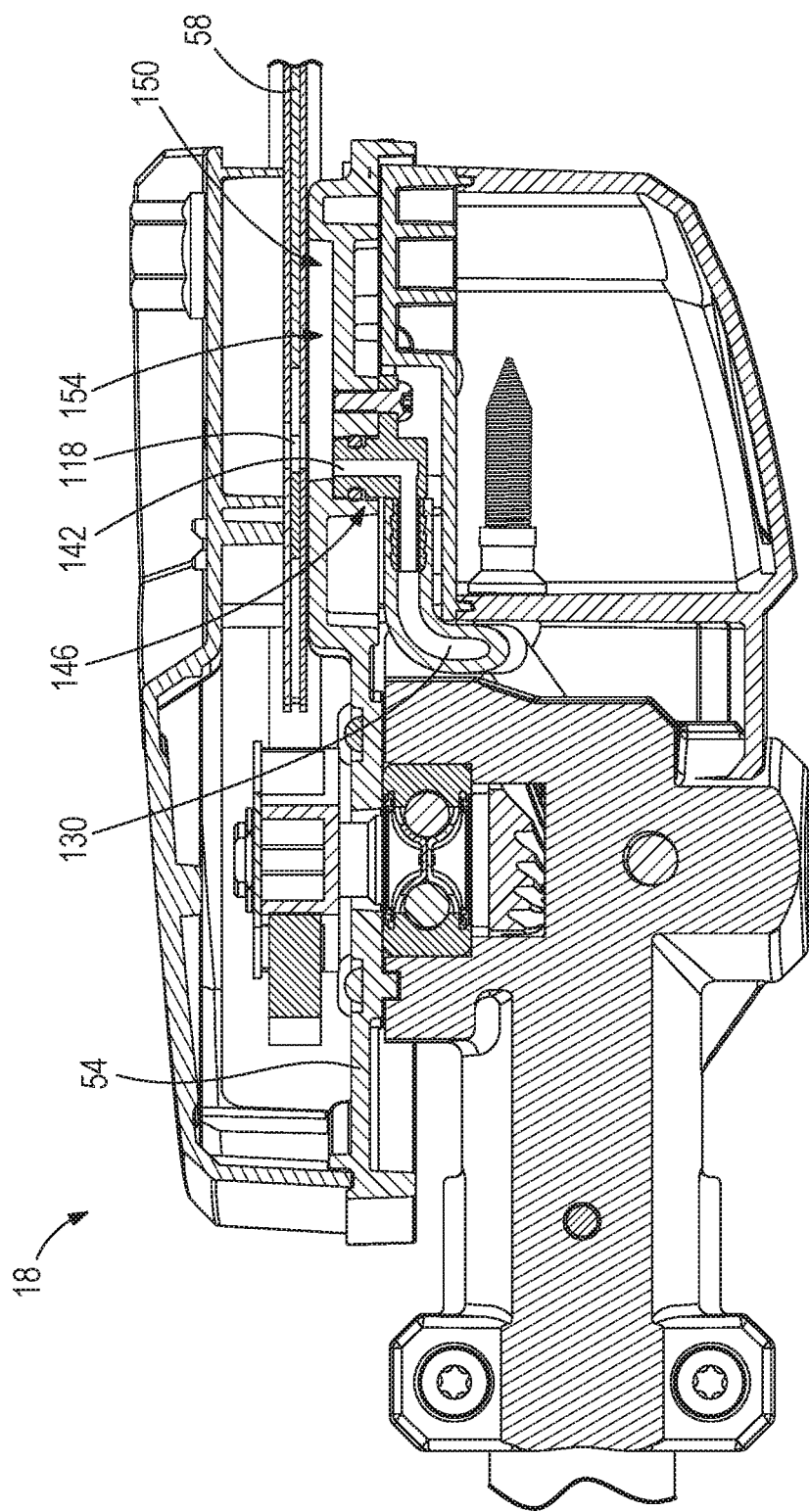
FIG. 22 is another cross-sectional view of the saw head of FIG. 2, taken along line 22-22 of FIG. 11.
Figure 23:
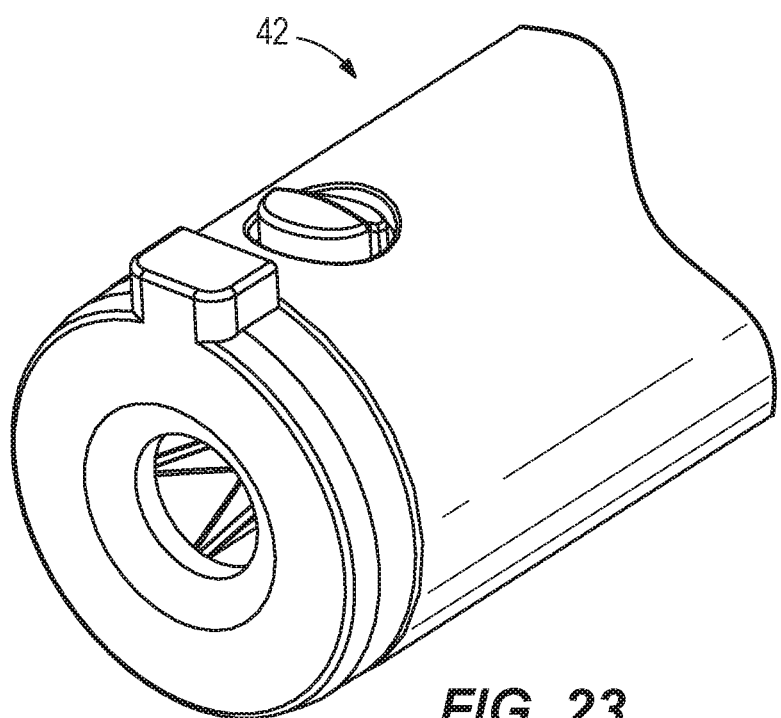
FIG. 23 is a perspective view of a connecting portion of the pole saw attachment shown in FIG. 2.

The oil pump 102 pumps lubricant through a fluid flow path 114 extending from the oil reservoir 94, through the oil pump 102, to a flow path outlet 118 (FIG. 22) to lubricate the guide bar 58 and the chain 26. The flow path 114 includes an inlet tube 122 (FIG. 17) extending from the reservoir 94 to a pump inlet 126 of the oil pump 102. An outlet tube 130 extends from a pump outlet 134 of the oil pump 102, passes behind an adjustment bracket 138 (FIG. 17), and fluidly couples to a hollow tube member 142 (FIG. 22) fastened to the support plate 54.

The tube member 142 extends through a flow path aperture 146 (FIG. 22) in the support plate 54 and terminates within a channel 150 defined between a flow path recess 154 in the support plate 54 and a surface of the guide bar 58. The channel 150 is fluidly connected to the flow path outlet 118. During operation of the outdoor tool T, oil flows through the flow path 114 from the reservoir 94 through the inlet tube 122, the oil pump 102, the outlet tube 130, the tube member 142, and the channel 150 to the flow path outlet 118 to lubricate the guide bar 58 and the chain 26.

Figure 20:
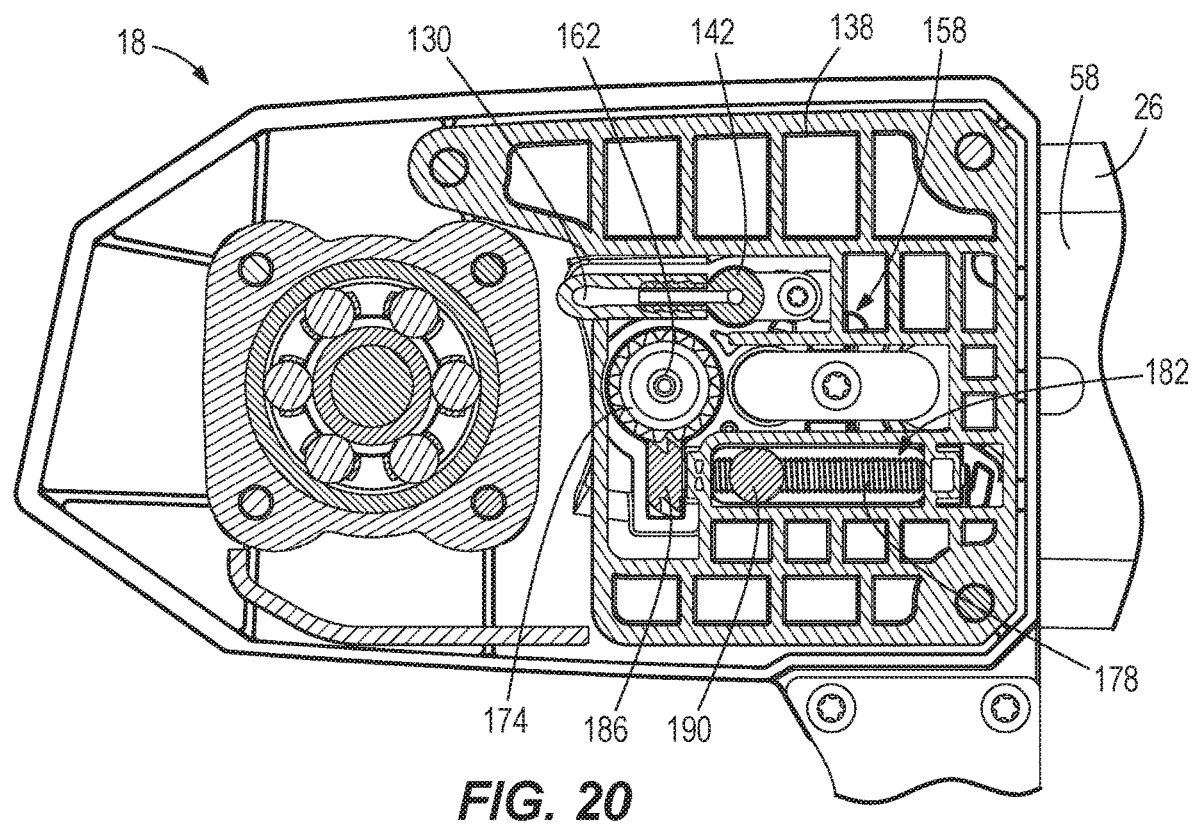
FIG. 20 is another cross-sectional side view of the saw head of FIG. 2, taken along line 20-20 of FIG. 12.

With reference to FIGS. 16 and 20, the saw head 18 includes a tension adjustment mechanism 158 operable to adjust a tension force of the chain 26 by adjusting the distance between the sprocket 62 and an end 160 of the guide bar 58. The tension adjustment mechanism 158 includes an adjustment screw 162 that extends through an axial slot 166 in the guide bar 58. The adjustment screw 162 also extends through a screw aperture 170 (FIG. 19) in the support plate 54.

A first adjustment gear 174 is coupled to an end of the adjustment screw 162 such that the two rotate together. A threaded adjustment bolt 178 is supported by the adjustment bracket 138 within an adjustment recess 182. A second adjustment gear 186 intermeshes with both the first adjustment gear 174 and the adjustment bolt 178. The first adjustment gear 174 engages the second adjustment gear 186 within the adjustment bracket 138, such that rotation of the adjustment screw 162 and the first adjustment gear 174 thereby causes the second adjustment gear 186 and the adjustment bolt 178 to rotate within the adjustment recess 182.

Figure 21:
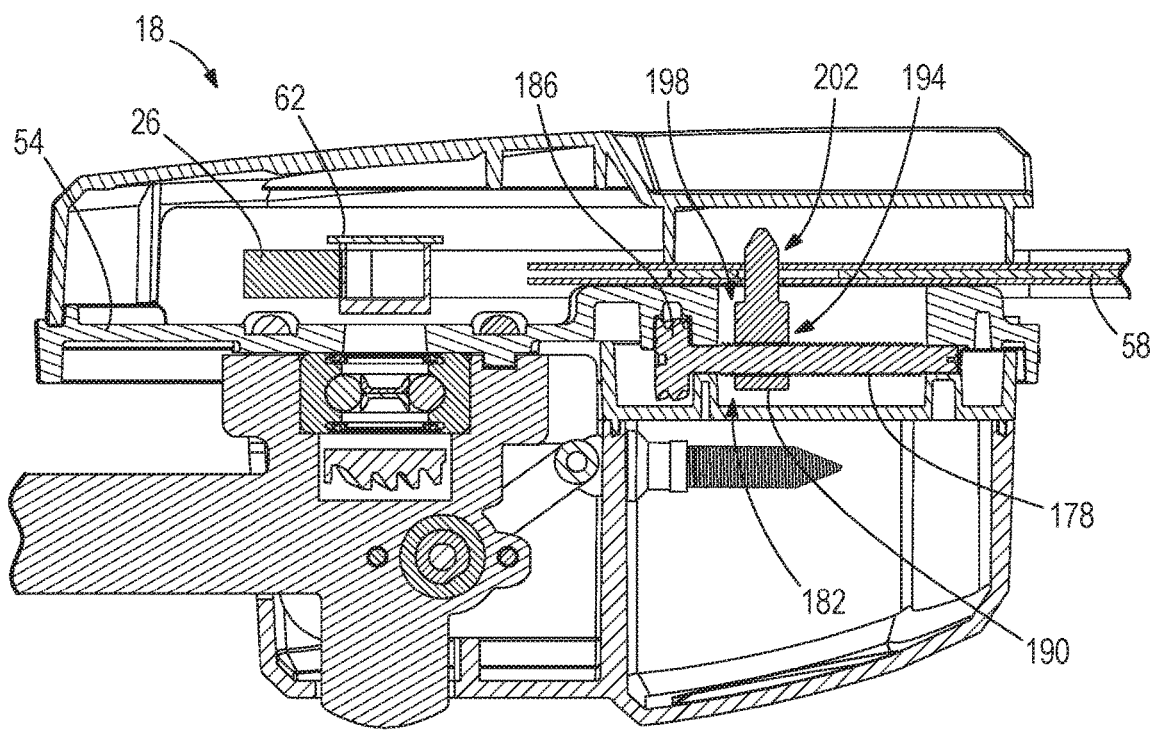
FIG. 21 is another cross-sectional view of the saw head of FIG. 2, taken along line 21-21 of FIG. 10.

An adjustment stud 190 (FIG. 20) is threadably engaged with the adjustment bolt and fixedly coupled to the guide bar 58. The adjustment stud 190 has a generally cylindrical shape and is oriented perpendicular to the guide bar 58. The adjustment stud 190 includes a threaded bolt aperture 194 (FIG. 21) that threadably engages the adjustment bolt 178 within the adjustment recess 182. The adjustment stud 190 extends from the adjustment recess 182 through a gap 198 formed by the support plate 54 and engages a stud aperture 202 formed in the guide bar 58. Rotation of the adjustment bolt 178 by the adjustment screw 162 causes the adjustment stud 190 to move forward or backward within the adjustment recess 182 (i.e., away from or toward the sprocket 62).

With reference to FIGS. 16 and 19, a threaded guide bar stud 206 is coupled to the support plate 54 and extends through the axial slot 166 of the guide bar 58. When the sprocket cover 70 is mounted to the saw head 18, the guide bar stud 206 also extends through a mounting aperture 210 (FIG. 19) in the sprocket cover 70. A nut 214 fastens to the guide bar stud 206 to secure the sprocket cover 70 to the saw head 18. The nut 214 is tightened to lock the guide bar 58 in position relative to the sprocket 62 and the support plate 54 and is loosened to unlock the guide bar 58 so that the tension of the chain 26 can be adjusted via the tension adjustment mechanism 158.

To adjust the tension, the nut 214 is first loosened (e.g., using a tool such as a wrench, socket and driver, etc.) to unlock the guide bar 58 from the support plate 54. When the nut 214 is loosened, the guide bar stud 206 continues to support the guide bar 58 but permits axial movement of the guide bar 58 relative to the support plate 54. With the nut 214 loosened, the adjustment screw 162 is rotated to adjust the tension in the chain 26. Rotation of the adjustment screw 162 rotates the first adjustment gear 174, which causes the second adjustment gear 186 and the adjustment bolt 178 to rotate. Rotation of the adjustment bolt 178 causes the adjustment stud 190 to translate forward or backward within the adjustment recess 182. Translation of the adjustment stud 190 causes the guide bar 58 to translate with the adjustment stud 190 and relative to the sprocket 62 due to the engagement of the adjustment stud 190 with the stud aperture 202 of the guide bar 58 thereby adjusting the chain tension.

The adjustment screw 162 is rotated in a direction corresponding to the desired tension adjustment. For example, in the illustrated construction and referring to FIG. 16, the adjustment screw 162 is rotated clockwise to translate the guide bar 58 away from the sprocket 62 and thereby increase the tension in the chain 26. To decrease the chain tension, the adjustment screw 162 is rotated counter-clockwise to translate the guide bar 58 toward the sprocket 62. In other constructions (not shown), the opposite may be true—clockwise rotation of the adjustment screw 162 may decrease the tension in the chain 26, and counter-clockwise rotation of the adjustment screw 162 may increase the tension in the chain 26.

Figure 24:
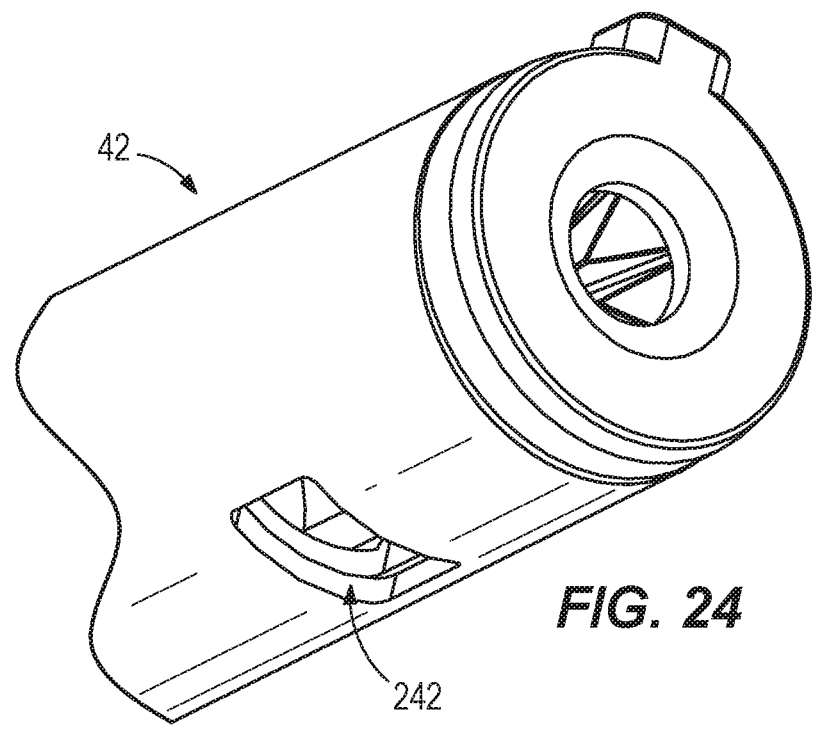
FIG. 24 is another perspective view of the connecting portion of FIG. 2.
Figure 25:
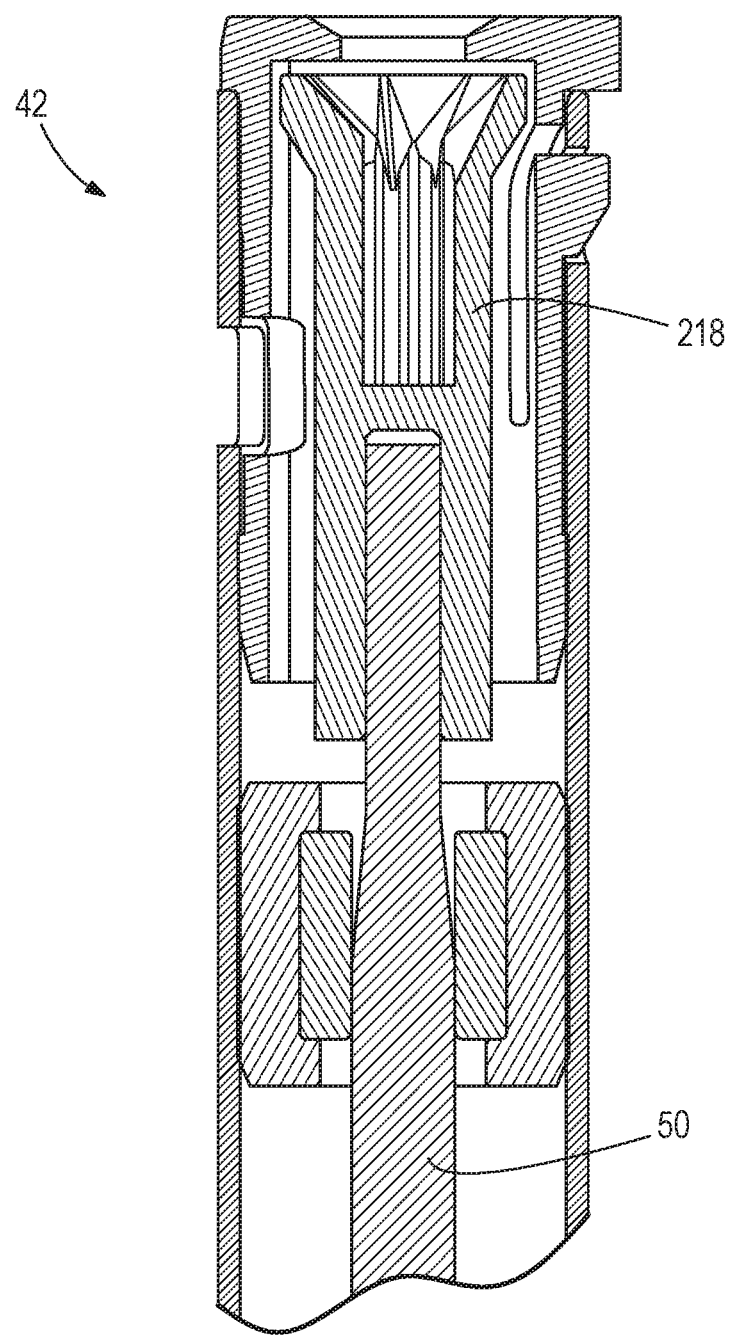
FIG. 25 is a cross-sectional view of the connecting portion of FIG. 2, taken along line 25-25 of FIG. 23.
Figure 26:
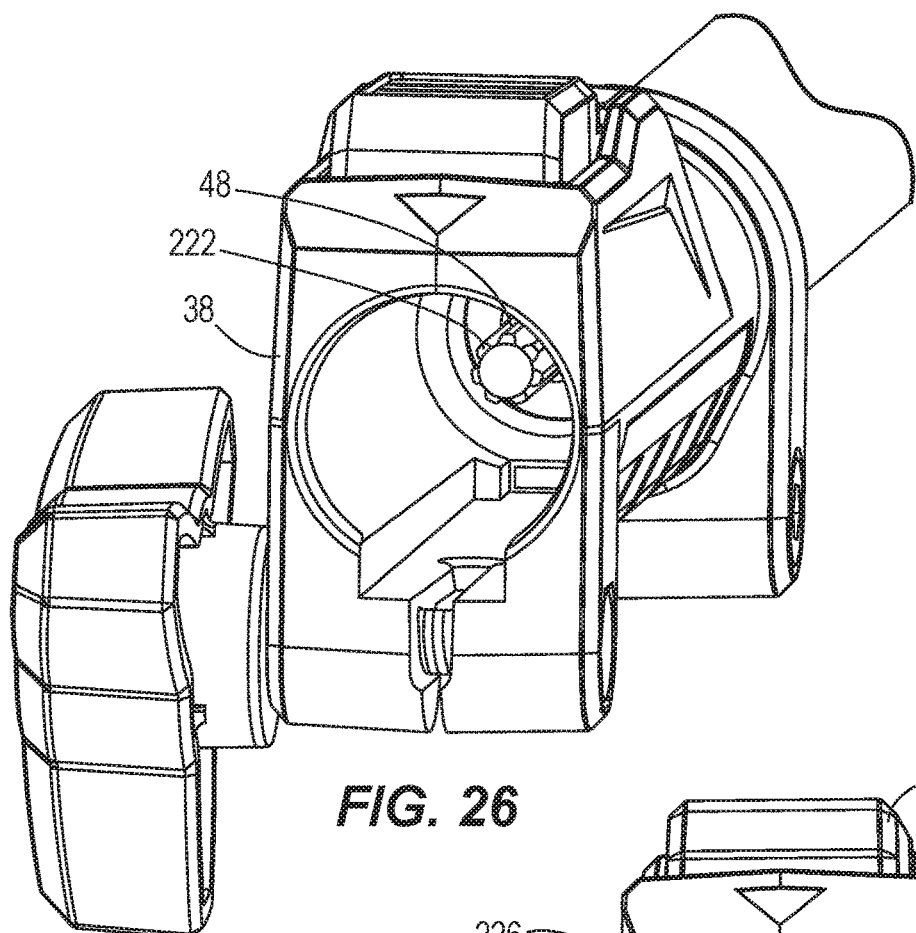
FIG. 26 is a perspective end view of a connecting portion of a powerhead of the pole saw shown in FIG. 1.

With reference to FIGS. 23-27, the attachment unit 34 also includes the second connecting portion 42 that selectively couples to the first connecting portion 38 of the powerhead unit 30. In the illustrated construction, the second driveshaft segment 50 terminates at the second connecting portion 42 in a spline hub 218 (FIG. 25). When the powerhead unit 30 is coupled to the attachment unit 34, a spline 222 (FIGS. 26-27) on the first driveshaft segment 46 selectively engages and rotatably couples to the spline hub 218, to transmit rotary power from the first driveshaft segment 48 and the second driveshaft segment 50 and, therethrough, from the powerhead unit 30 to the saw head 18.

Figure 27:
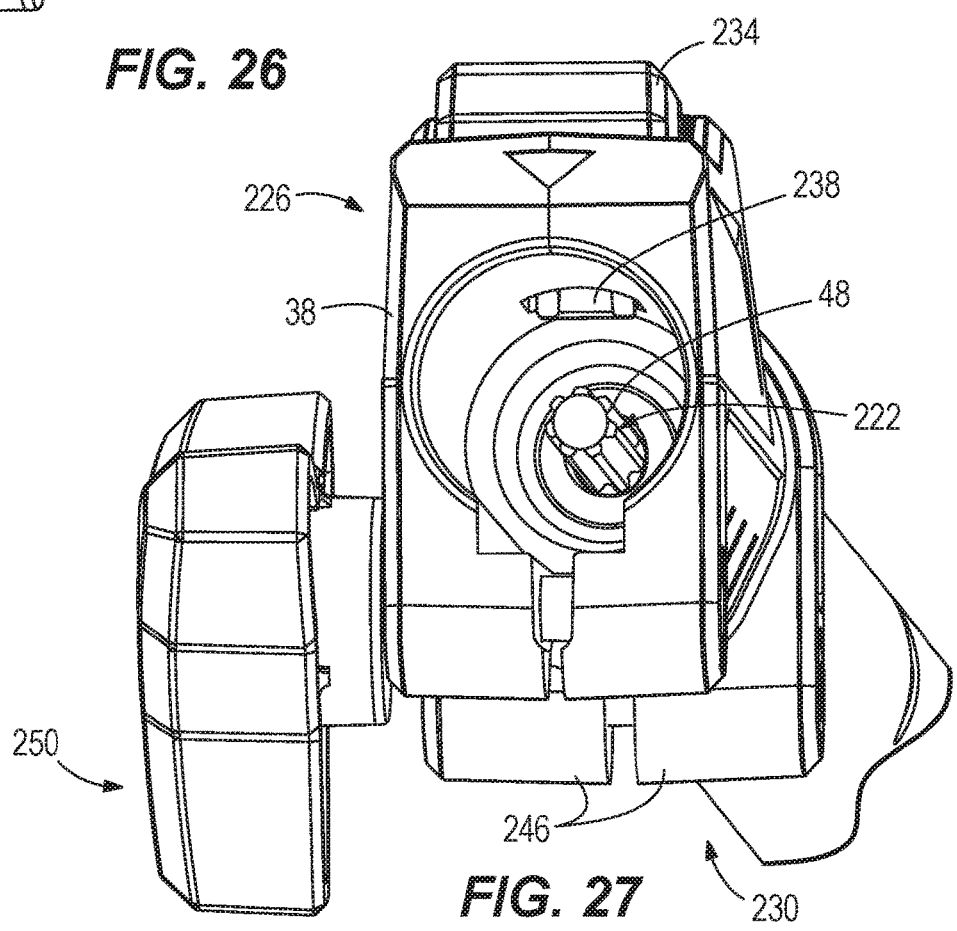
FIG. 27 is another perspective end view of the connecting portion as shown in FIG. 26.

As described in more detail in U.S. Provisional Patent Application No. 62/675,661, filed May 23, 2018, entitled "POWERHEAD UNIT FOR TOOL", and in corresponding U.S. patent application Ser. No. 16/417,713, filed May 21, 2019, entitled "POWERHEAD UNIT FOR TOOL", as shown in FIGS. 24 and 27, a retainer assembly (e.g., a quick-release mechanism 226 and a clamping mechanism 230) is provided between the connecting portions 38, 42. The illustrated mechanism 226 includes a spring-biased button 234 with a projection 238 engageable in a recess 242 (FIG. 24) to selectively and releasably retain the connecting portions 38, 42. The connecting portion 38 is formed with clamping flanges 246 engaged by a clamping actuator 250 (e.g., a bolt and nut) to apply a clamping force to the connecting portion 42.

One or more independent features and/or independent advantages of the invention may be set forth in the claims.

What is claimed is:

1. An outdoor tool comprising:
   a powerhead;
   a tool unit powered by the powerhead;
   an elongated shaft assembly defining a longitudinal shaft axis and extending between the powerhead and the tool unit, the elongated shaft assembly including
      a first shaft segment,
      a first connecting portion attached to the first shaft segment,
      a second shaft segment, and
      a second connecting portion attached to the second shaft segment and configured to selectively and removably couple to the first connecting portion;
   wherein one of the first connecting portion and the second connecting portion includes a recess, and the other of the first connecting portion and the second connecting portion includes a button having a projection selectively receivable in the recess to releasably secure the first connecting portion to the second connecting portion, the projection configured to move radially inward to enter the recess;
   the tool unit including
      a transmission housing fixed to the shaft assembly,
      a support plate coupled to the transmission housing,
      a guide bar adjustably supported by the support plate,
      a drive gear rotatably supported by the transmission housing, and a chain circumscribing a portion of the drive gear and a portion of the guide bar, the drive gear operatively coupled to the powerhead for driving the chain about the guide bar; and a tension adjustment mechanism for adjusting a position of the guide bar relative to the drive gear in order to increase and decrease a tension in the chain, the tension adjustment mechanism including an adjustment screw, a threaded adjustment bolt, at least one adjustment gear intermeshed with the adjustment screw and the adjustment bolt, and a stud member coupled to the adjustment bolt and the guide bar, the stud member having a generally cylindrical shape and being oriented perpendicular to the guide bar, wherein rotation of the adjustment screw rotates the adjustment bolt and thereby causes translation of the guide bar relative to the drive gear via engagement with the stud member;

wherein the one of first connecting portion and the second connecting portion includes a radially projecting key, and the other of the first connecting portion and the second connecting portion defines an axially extending groove, and wherein when the first connecting portion is coupled to the second connecting portion, the groove receives the key to rotationally align the first connecting portion with the second connecting portion; and wherein the other of the first connecting portion and the second connecting portion includes a clamping mechanism comprising a pair of flanges and a clamping actuator configured to apply a clamping force to the second connecting portion, and wherein each of the flanges defines a portion of the groove.

2. The outdoor tool of claim 1, wherein the adjustment bolt is supported by an adjustment bracket.

3. The outdoor tool of claim 1, wherein the tension adjustment mechanism further includes a guide bar stud coupled to the support plate and a nut engaged with the guide bar stud, wherein a cover is coupled to the support plate via the guide bar stud and the nut and configured to shield the drive gear, and wherein tightening the nut against the cover locks the guide bar in a fixed position relative to the drive gear and the support plate, and further wherein loosening the nut unlocks the guide bar to permit the adjustment of the guide bar relative to the drive gear.

4. The outdoor tool of claim 3, wherein the guide bar stud extends through a mounting aperture formed in the cover.

5. The outdoor tool of claim 1, wherein rotation of the adjustment screw causes the stud member to translate toward or away from the drive gear.

6. The outdoor tool of claim 1, wherein clockwise rotation of the adjustment screw causes the guide bar to translate away from the drive gear to increase the tension in the chain, and wherein counter-clockwise rotation of the adjustment screw causes the guide bar to translate toward the drive gear to decrease the tension in the chain.

7. The outdoor tool of claim 1, wherein the stud member is threaded onto the adjustment bolt.

8. The outdoor tool of claim 7, wherein the stud member engages a stud aperture formed in the guide bar.

9. An outdoor tool comprising:

a powerhead;

a tool unit powered by the powerhead;

an elongated shaft assembly defining a longitudinal shaft axis and extending between the powerhead and the tool unit, the elongated shaft assembly including a first shaft segment, a first connecting portion attached to the first shaft segment, a second shaft segment, and a second connecting portion attached to the second shaft segment and configured to selectively and removably couple to the first connecting portion;

wherein one of the first connecting portion and the second connecting portion includes a clamping mechanism comprising a pair of flanges and a clamping actuator configured to apply a clamping force to the other of the first connecting portion and the second connecting portion, each flange defining a portion of an axially extending groove, and the other of the first connecting portion and the second connecting portion including a radially projecting key configured to be received into the groove configured to receive the key to rotationally align the first connecting portion with the second connecting portion;

the tool unit including a support plate, a guide bar adjustably supported by the support plate, a drive gear, and a chain circumscribing a portion of the drive gear and a portion of the guide bar, the drive gear operatively coupled to the powerhead for driving the chain about the guide bar; and a tension adjustment mechanism for adjusting a position of the guide bar relative to the drive gear in order to increase and decrease a tension in the chain, the tension adjustment mechanism including an adjustment screw, a threaded adjustment bolt, at least one adjustment gear intermeshed with the adjustment screw and the adjustment bolt, and a stud member coupled to the adjustment bolt and the guide bar, the stud member having a generally cylindrical shape and being oriented perpendicular to the guide bar, wherein rotation of the adjustment screw rotates the adjustment bolt and thereby causes translation of the guide bar relative to the drive gear via engagement with the stud member.

* * * * *